United States Patent
Rud (10) Patent No.: US 9,222,844 B2
(45) Date of Patent: Dec. 29, 2015

(54) PROCESS TEMPERATURE TRANSMITTER WITH IMPROVED SENSOR DIAGNOSTICS

(71) Applicant: Rosemount Inc., Chanhassen, MN (US)

(72) Inventor: Jason H. Rud, Mayer, MN (US)

(73) Assignee: Rosemount Inc., Chanhassen, MN (US)

( * ) Notice: Subject to any disclaimer, the term of this patent is extended or adjusted under 35 U.S.C. 154(b) by 348 days.

(21) Appl. No.: 13/775,848

(22) Filed: Feb. 25, 2013

(65) Prior Publication Data

US 2014/0241399 A1 Aug. 28, 2014

(51) Int. Cl.
| | |
|---|---|
| G01K 15/00 | (2006.01) |
| G01K 7/00 | (2006.01) |
| G01K 7/20 | (2006.01) |
| G01K 1/02 | (2006.01) |

(52) U.S. Cl.
CPC .............. *G01K 15/007* (2013.01); *G01K 1/024* (2013.01); *G01K 7/20* (2013.01)

(58) Field of Classification Search
USPC .............................................. 374/1, 183, 166
See application file for complete search history.

(56) References Cited

U.S. PATENT DOCUMENTS

| | | | |
|---|---|---|---|
| 5,317,520 A | 5/1994 | Castle | |
| 5,669,713 A * | 9/1997 | Schwartz et al. .................. | 374/1 |
| 5,703,575 A | 12/1997 | Kirkpatrick | |
| 5,741,074 A * | 4/1998 | Wang ........................ | G01K 7/21 |
| | | | 374/173 |
| 5,828,567 A * | 10/1998 | Eryurek et al. .................. | 700/79 |
| 5,829,876 A | 11/1998 | Schwartz et al. | |
| 6,356,191 B1 * | 3/2002 | Kirkpatrick et al. .......... | 340/501 |
| 6,473,710 B1 * | 10/2002 | Eryurek ........................ | 702/133 |
| 6,519,546 B1 * | 2/2003 | Eryurek et al. ............... | 702/130 |
| 6,539,267 B1 * | 3/2003 | Eryurek et al. .................. | 700/51 |
| 6,556,145 B1 * | 4/2003 | Kirkpatrick et al. ..... | 340/870.17 |
| 6,594,603 B1 | 7/2003 | Eryurek et al. | |
| 6,754,601 B1 * | 6/2004 | Eryurek et al. ............... | 702/104 |
| 7,259,686 B2 * | 8/2007 | Hollander .............. | G01K 7/023 |
| | | | 340/538 |
| 7,321,846 B1 * | 1/2008 | Huisenga et al. ............. | 702/183 |
| 7,658,539 B2 | 2/2010 | Engelstad | |
| 8,898,036 B2 * | 11/2014 | Sittler et al. ................... | 702/184 |
| 2002/0169582 A1 * | 11/2002 | Eryurek et al. ............... | 702/183 |
| 2005/0030185 A1 * | 2/2005 | Huisenga et al. ............. | 340/635 |
| 2005/0052274 A1 * | 3/2005 | Mattoon ................ | G01K 1/026 |
| | | | 338/25 |
| 2005/0072239 A1 * | 4/2005 | Longsdorf et al. .............. | 73/649 |
| 2006/0116845 A1 * | 6/2006 | Pan .......................... | G01K 7/01 |
| | | | 702/130 |

(Continued)

FOREIGN PATENT DOCUMENTS

WO  WO 2012/027115  3/2012

OTHER PUBLICATIONS

Notification of Transmittal of the International Search Report and the Written Opinion of the International Searching Authority for PCT/US2013/074687, dated Jul. 4, 2014.

*Primary Examiner* — Mirellys Jagan
(74) *Attorney, Agent, or Firm* — Westman, Champlin & Koehler, P.A.

(57) ABSTRACT

A process temperature transmitter is operable with at least one temperature sensor having a plurality of leads. The temperature transmitter includes measurement circuitry operably coupleable to the at least one temperature sensor to provide an indication of an electrical parameter of the at least one temperature sensor. A controller is coupled to the measurement circuitry to obtain the indication and provide a process temperature output. A current source applies a test current to the plurality of leads simultaneously. Diagnostic circuitry measures a voltage response on each lead in order to provide a diagnostic indication of the temperature sensor.

20 Claims, 8 Drawing Sheets

(56) References Cited

U.S. PATENT DOCUMENTS

| | | | |
|---|---|---|---|
| 2007/0010968 A1* | 1/2007 | Longsdorf et al. | 702/183 |
| 2008/0125884 A1* | 5/2008 | Schumacher et al. | 700/79 |
| 2008/0133170 A1* | 6/2008 | Engelstad | 702/130 |
| 2008/0156090 A1* | 7/2008 | Wehrs | 73/290 R |
| 2010/0177800 A1 | 7/2010 | Rud et al. | |
| 2010/0189158 A1* | 7/2010 | Rock | H04Q 9/00 374/141 |
| 2011/0299567 A1* | 12/2011 | Rud et al. | 374/181 |
| 2012/0051399 A1* | 3/2012 | Rud et al. | 374/185 |
| 2014/0003465 A1* | 1/2014 | Elke | 374/179 |
| 2014/0088905 A1* | 3/2014 | Rud | 702/99 |

* cited by examiner

PROCESS TEMPERATURE TRANSMITTER WITH IMPROVED SENSOR DIAGNOSTICS

BACKGROUND

The present invention relates to process variable transmitters of the type used to monitor process variables in industrial processes. More specifically, the present invention relates to process variable transmitters which are used to sense a temperature of a process.

The process industry employs process variable transmitters to monitor process variables associated with substances such as solids, slurries, liquids, vapors, and gasses in chemical, pump, petroleum, pharmaceutical, food and other processing plants. Process variables include pressure, temperature, flow, level, turbidity, density, concentration, chemical composition and other properties. A process fluid temperature transmitter provides an output related to a sensed process substance temperature. The temperature control loop to a control room, or the output can be communicated to another process device such that the process can be monitored and controlled. In order to monitor a process fluid temperature, the transmitter includes a temperature sensor, such as a thermocouple or a resistance temperature device (RTD).

In temperature measurement applications, it is important to identify when a temperature measurement is incorrect. This may be due to lead/sensor breakage, excessive line resistance, or shorting conditions. There are typically a number of connection points between a temperature sensor and a process temperature transmitter that can fail or become degraded. Some commercially-available process temperature transmitters verify the temperature sensor connection integrity before providing readings. Examples of temperature transmitters which include diagnostics include Kirkpatrick et al. (U.S. Pat. No. 6,556,145 entitled TWO-WIRE FLUID TEMPERATURE TRANSMITTER WITH THERMOCOUPLE DIAGNOSTICS), Castle (U.S. Pat. No. 5,317,520 entitled COMPUTERIZED REMOTE RESISTANCE MEASUREMENT SYSTEM WITH FAULT DETECTION), Kirkpatrick (U.S. Pat. No. 5,703,575 entitled OPEN SENSOR DIAGNOSTIC SYSTEM FOR TEMPERATURE TRANSMITTER IN A PROCESS CONTROL SYSTEM), among others.

One such diagnostic technique which has been used in temperature-transmitters is based upon the collection of multiple measurements. These measurements are collected sequentially by the process temperature transmitter to test each conductor independently. For open sensor and excessive line resistance testing, a process temperature transmitter can apply a current pulse to each of the temperature sensor leads individually and measure the resulting voltage. If the measured voltage exceeds a threshold, a fault can be identified. If a leadwire or temperature sensor element is open, the current pulse will drive the measured voltage high enough to exceed the threshold. When the lead is properly connected and the sensor element is not damaged, a path is provided for current to flow and the sensed voltage will remain below the threshold, indicating a proper connection. For a 4-wire RTD, this requires three open sensor measurements to evaluate the integrity of the RTD (one wire is always connected to the circuit common for the current return path).

Wire-wound RTD temperature sensors are susceptible to becoming shorted from exposure to vibration. Such vibration can include high magnitude transients, persistent, lower magnitude events, or both. To test for a shorted sensor condition, a resistive measurement of the temperature sensing element is obtained. If the ohmic measurement is lower than a threshold set by software, the sensor is determined to be shorted. This process currently requires three measurement points to identify this condition and may take on the order of 200 milliseconds.

There is an ongoing need for improved temperature sensor diagnostics.

SUMMARY

A process temperature transmitter is operable with at least one temperature sensor having a plurality of leads. The temperature transmitter includes measurement circuitry operably coupleable to the at least one temperature sensor to provide an indication of an electrical parameter of the at least one temperature sensor. A controller is coupled to the measurement circuitry to obtain the indication and provide a process temperature output. A current source applies a test current to the plurality of leads simultaneously. Diagnostic circuitry measures a voltage response on each lead in order to provide a diagnostic indication of the temperature sensor.

DETAILED DESCRIPTION OF ILLUSTRATIVE EMBODIMENTS

The present invention provides diagnostics for a process temperature transmitter. In various aspects, the invention provides a method and apparatus for quickly and accurately determining a condition of a temperature sensor including verifying that the transmitter is properly connected to the temperature sensor. Embodiments of the present invention generally provide a method and apparatus that tests a plurality, and preferably all, temperature sensor lines simultaneously for open and/or shorted sensor conditions or other degraded behavior, thereby reducing or potentially minimizing sensor evaluation time. The diagnostics described below may be performed before each temperature sensor measurement or at a selected interval or other time as desired.

Figure 1:
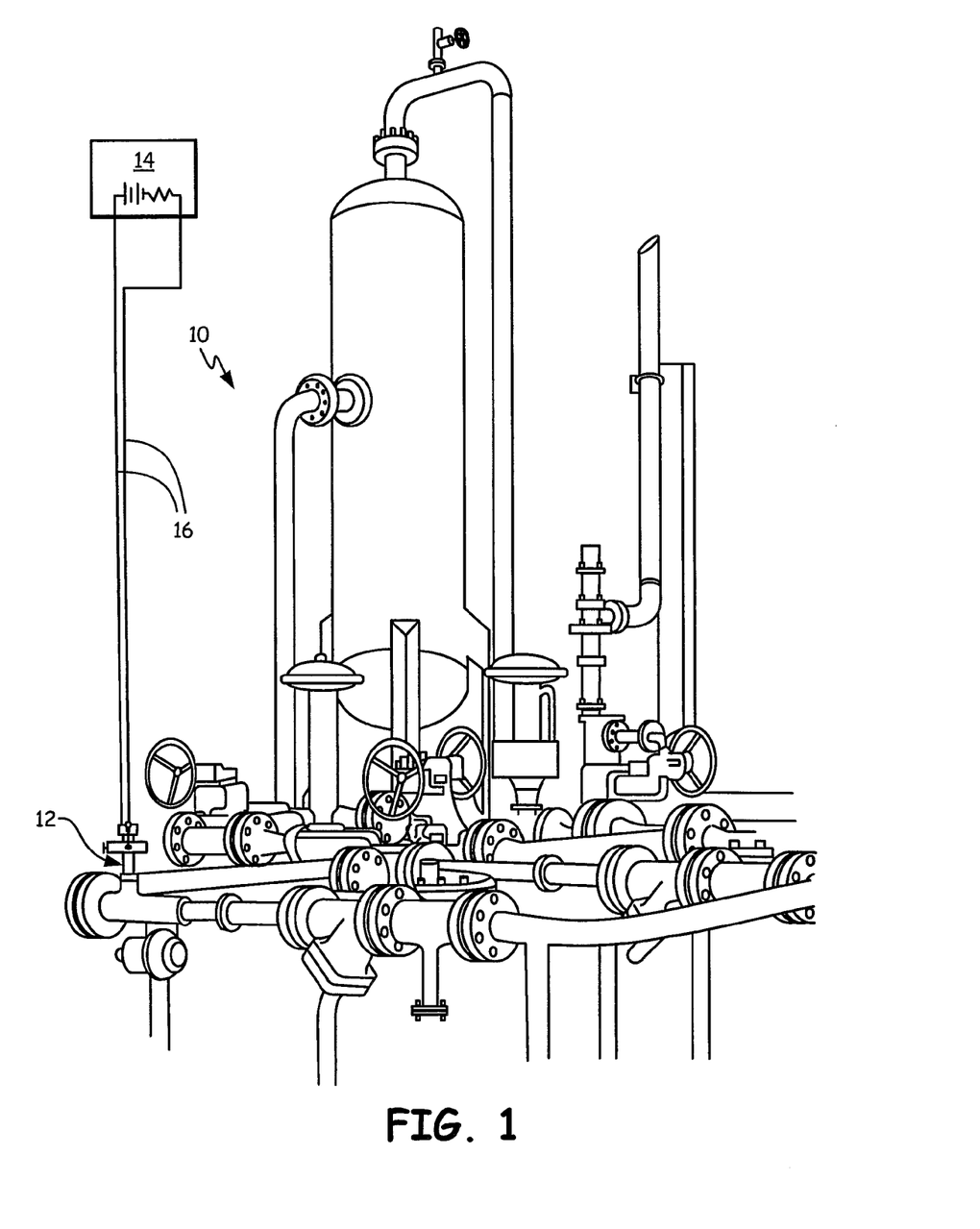
FIG. 1 is a diagram of the environment of a process fluid temperature transmitter.
Figure 2:
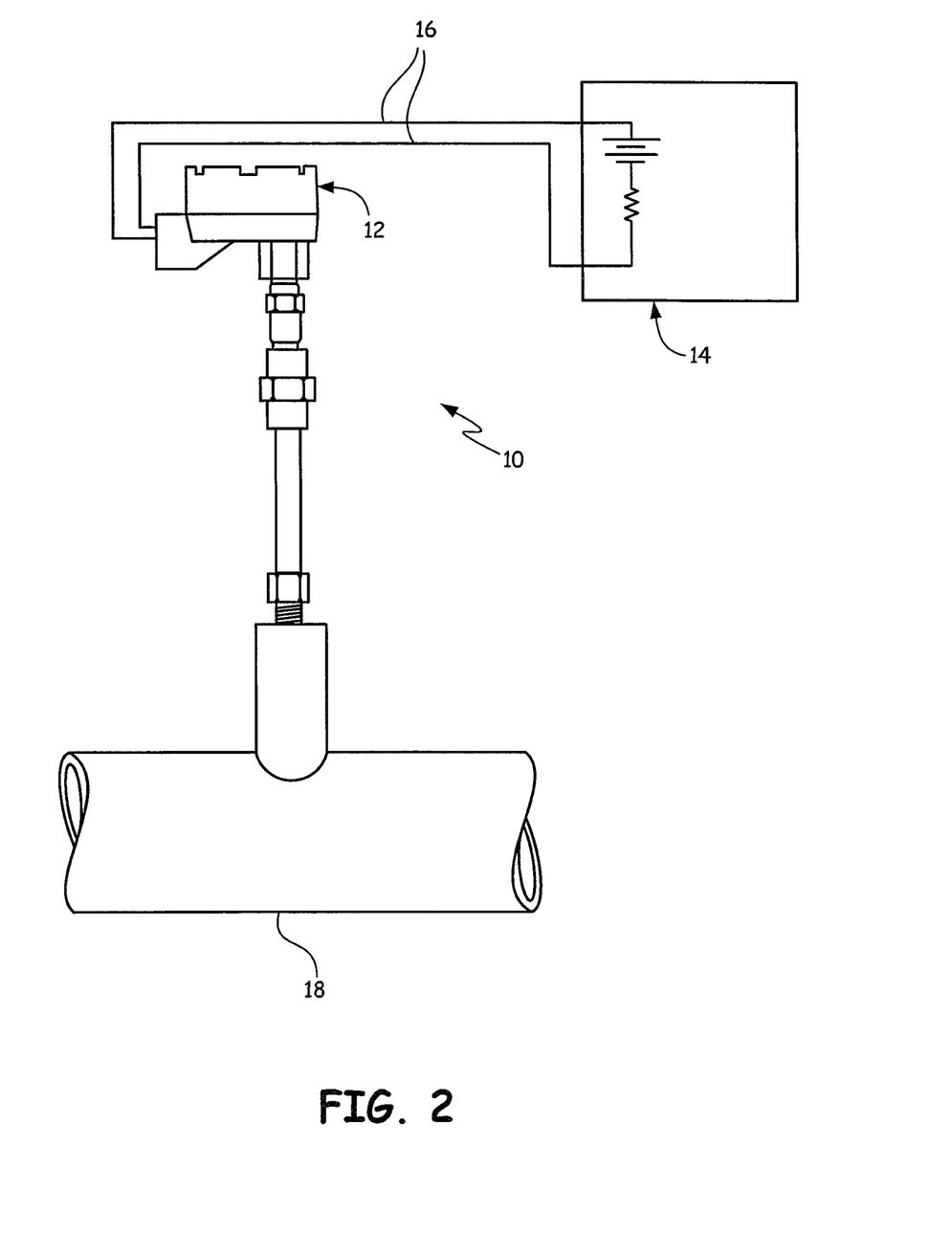
FIG. 2 is a diagrammatic view of process fluid temperature transmitter 12.

FIGS. 1 and 2 illustrate an environment of a two-wire process fluid temperature transmitter in accordance with embodiments of the invention. FIG. 1 shows process fluid control system 10 including process fluid temperature transmitter 12. FIG. 2 illustrates process control system 10 including process fluid temperature transmitter 12 electrically coupled to control room 14 (modeled as voltage source and resistance) over a two-wire process control loop 16. Transmitter 12 is mounted on and coupled to a process fluid container such as pipe 18. Transmitter 12 monitors the temperature of process fluid process pipe 18 and transmits temperature information to control room 14 over loop 16. Transmitter 12 is couplable to loop 16 through terminals 17 (shown in FIG. 3). Process control loop 16 is illustrated as a two-wire process control loop. In such a configuration, the same two wires are used both for carrying information as well as providing power to transmitter 12. For example, the transmitter 12 can control an analog current level on the two-wire loop 16 which is representative of the sensed temperature. In more advanced configurations, digital information can also be transmitted and/or received over the two-wire process control loop. One such protocol is the HART® communication protocol. However, the present invention is not limited to this particular two-wire implementation and any type of process control loop may be employed. Another example process control loop is a wireless process control loop in which information is transmitted wirelessly. One example of wireless communication technique is in accordance with the Wireless HART® communication protocol in accordance with the IEC 62591. Standard Ethernet, fiberoptic connection, or other communication channels may also be used.

Figure 3:
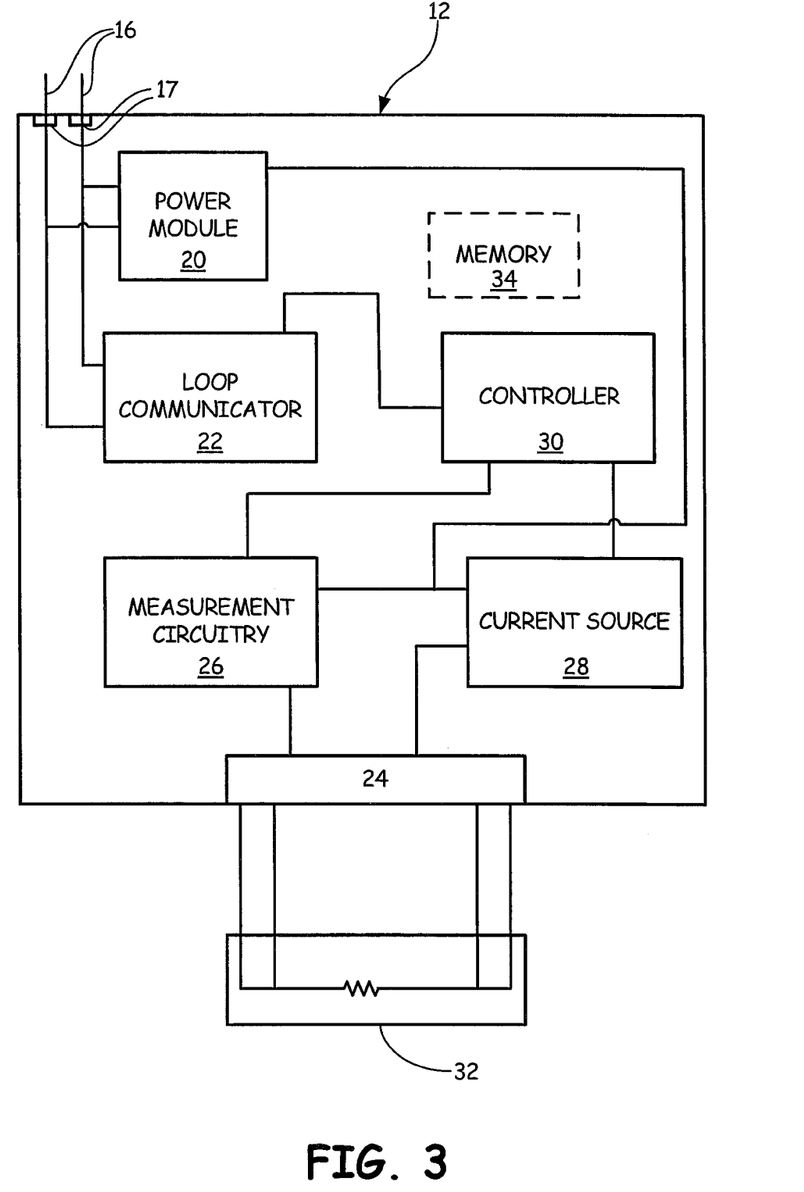
FIG. 3 is a system block diagram of a process fluid temperature transmitter.

FIG. 3 is a system block diagram of process fluid transmitter 12 in accordance with an embodiment of the invention. Transmitter 12 includes power module 20, loop communicator 22, RTD input 24, measurement circuitry 26, current source 28, and controller 30. Transmitter 12 is couplable to RTD 32 such that transmitter 12 can obtain a voltage measurement from RTD 32, and relate the measurement to a calculated process fluid temperature. Transmitter 12 then provides the calculated process fluid temperature on two-wire process control loop 16.

Power module 20 is disposed within transmitter 12, and is couplable to two-wire process control loop 16. Module 20 suitably conditions power received from loop 16 for the various components of transmitter 12. Utilizing power module 20, transmitter 12 is able to operate solely upon power received from process control loop 16. Module 20 can comprise, for example, known electronics such as a DC-DC power regulation device. On loop 16, which in some embodiments employs analog signaling between 4 and 20 mA, module 20 operates to condition four or less milliamps for provision to other components within transmitter 12. Additionally, module 20 can be adapted to prevent electrical noise received from loop 16 to reach the other components.

Loop communicator 22 is couplable to two-wire process control loop 16, and is configured to communicate over loop 16. Communicator 22 can be of the type generally known in the art. For example, communicator 22 can be suitably selected to provide analog communication, digital communication, or a combination of the two. As discussed above, one such combination of analog and digital communication is known as the Highway Addressable Remote Transducer (HART®) protocol. One version of the HART® protocol superimposes a digital signal upon a 4-20 mA analog signal. With such a protocol, the primary variable of interest can be provided in one mode, such as the analog mode, while a diagnostic signal is provided in the other mode. However, the present invention can be practiced with purely analog communications, as well as purely digital communications (such as provided by FOUNDATION™ Fieldbus) and may also be implemented using wireless protocols.

Transmitter 12 also includes RTD input or terminal block 24. Input or terminal block 24 provides a removable electrical coupling to RTD 32. Typically, the coupling will provide a four-wire coupling whereby a Kelvin connection to the RTD can be obtained. With the Kelvin connection, two wires are used to send current through the RTD while a second pair of wires is used to sense the voltage across the RTD. As is known in the art, this reduces errors in resistance measurements.

Measurement circuitry 26 is disposed within transmitter 12, and is adapted to measure a voltage across the RTD 32 in response to a current applied using current source 28. Measurement circuitry 26 may include an amplifier and/or an analog-to-digital converter. Operation of current source is discussed in more detail below for diagnostic purposes.

Current source 28 is coupled to input 24, power module 20, and controller 30. Current source 28 can be any suitable circuitry capable of passing a known diagnostic current through an RTD connected to input 24. Diagnostic currents as low as one microamp can be used. For example, source 28 can be a precision semiconductor current device, or the like. source 28 can be adapted to pass direct current (DC) or alternating current (AC) through RTD 32. Additionally, source 28 can be circuitry that provides an unknown current through a known resistance, such that the current can be measured, optionally with measurement circuitry 26. During a diagnostic mode, source 28 passes a diagnostic current through RTD 32. The diagnostic current can be passed in either direction through RTD 32, and can also be alternately passed through RTD 32 in opposite directions. While the diagnostic current passes through RTD 32, measurement circuitry 26 provides a signal to controller 30 that is related to the voltage across RTD 32, and thus is related to the resistance of RTD 32.

Controller 30 is disposed within transmitter 12, and is coupled to power module 20, loop communicator 22, measurement circuitry 26, and current source 28. Controller 30 can be any suitable circuitry capable of relating voltage information received from measurement circuitry 26 to process fluid temperature, and capable of providing RTD diagnostics. Specifically, controller 30 can be a microprocessor or the like. During normal operation, current source 28 passes a current through RTD 32, and measurement circuitry 26 measures the resultant voltage. Controller 30 relates the information received from measurement circuitry 26 to process fluid temperature through suitable equations or a look-up table. Controller 30 then passes process variable output information to loop communicator 22, such that the process variable is communicated over two-wire process control loop 16.

During operation, it is possible that the RTD fails, that the electrical connections to the RTD fail, or that associated measurement circuitry fails. As described in the background section, various techniques are known to detect such failures. However, many of these techniques have limitations. For example, process temperatures can change quickly. This may be particularly so when a problem arises within the process. Further, even in situations that are not problematic, providing process temperature readings expeditiously may allow improved resolution into the process thereby facilitating diagnostics and/or optimizations. However, some prior art diagnostic techniques can take a significant amount of time during which temperature measurements cannot be obtained.

Some prior art diagnostic techniques can take a relatively long time to determine if a temperature sensor is faulty. In the case of open sensor detection up to three measurements are performed per 4-wire RTD sensor requiring about 60 milliseconds (mS) each. Some temperature transmitters have reduced this time to a 20 mS rate, which is the limit of typical hardware. However, since some temperature transmitters can measure eight 3-wire RTD sensors that each require 2 open sensor scans for detection, the transmitter must devote at least 40 mS per sensor, or 320 mS total, for open sensor detection.

Another limitation of some temperature transmitters is that they are not capable of determining if an RTD sensor is shorted until the final measurement is calculated. In a high density device, this time can be time significant (~200 mS per sensor).

Another error source in process temperature transmitters is due to sensor line capacitance that can increase if the sensor cabling becomes degraded, resulting in an increased measurement time constant. An increased time constant within the measurement loop can cause inaccuracies due to an insufficient settling time parameter setting within the A/D converter. This situation is not detectable by simply testing the sensor lines for open indication. This condition may only be detectable if an operator manually evaluates the accuracy of the measurement system. Additionally, capacitances within the process temperature transmitter may also increase.

In accordance with an embodiment of the present invention, a plurality of sensor measurement leads are tested simultaneously by injecting a current on each such sensor lead and monitoring voltage characteristics of the leads simultaneously. This technique can be used to determine open, shorted, and degraded sensor conditions all at the same time (in parallel). Embodiments of the present invention can be practiced internal or external to an A/D Application Specific Integrated Circuit (ASIC).

Figure 4:
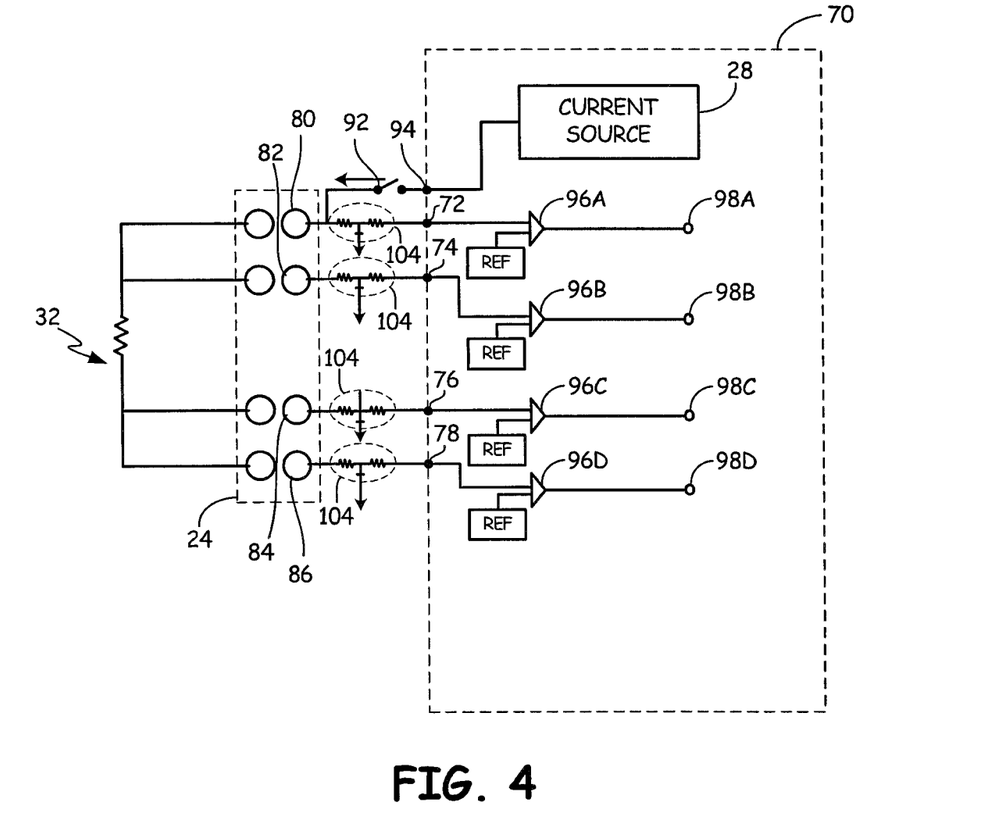
FIG. 4 is a schematic diagram showing electrical connections to a temperature sensor.

FIG. 4 is a diagrammatic view of open sensor diagnostic circuitry 70 in transmitter 12 coupled to RTD 32 to simultaneously test a plurality of leads in accordance with an embodiment of the present invention. Circuitry 70 may be provided within an A/D converter, within an A/D converting ASIC, or simply as part of circuitry within a process temperature transmitter, such as transmitter 12. Circuitry 70 has inputs 72, 74, 76, and 78 that couple to respective terminals 80, 82, 84, and 86 of terminal block 24. Each of the four leads of RTD 32 is coupled to a respective terminal on terminal block 24. Upon closure of switch 92, current from current source output 28 is coupled to all leads of RTD 32 simultaneously. As illustrated in FIG. 4, each lead of RTD 32 is coupled to a respective comparator circuit 96A, 96B, 96C and 96D that compares the external lead voltage within a threshold in order to evaluate an open sensor state. A plurality of, and preferably all, leads are tested at the same time. As used herein, being tested "at the same time" or "simultaneously" means the test current flows through to multiple leads at the same time. Thus, although testing of comparator outputs 96A-D may occur sequentially with the programmatic execution of a processor of controller 30, such testing is deemed to occur at the same time, because the microcontroller cycles orders of magnitude faster than previous sequential lead testing. If all leads are properly connected, and not open, each comparator 96A-D will generate a signal indicating that the voltage on its respective input 72, 74, 76, 78, has exceeded the voltage applied at its reference terminal. If, however, one of the leads is open, the expected voltage will not be seen at the comparator's input.

In another example embodiment, diagnostic circuitry 70 includes an analog-to-digital converter. In such a configuration, the analog-to-digital converter can sequentially, in a very rapid manner, digitize the output from connections 72, 74, 76, and 78. The comparison with a threshold can then be performed within a microprocessor in accordance with programming instructions. In such a configuration, the digitized values are compared with one or more thresholds stored in a memory or the like. These thresholds can be modified as desired based upon a particular application or other criteria.

Figure 5:
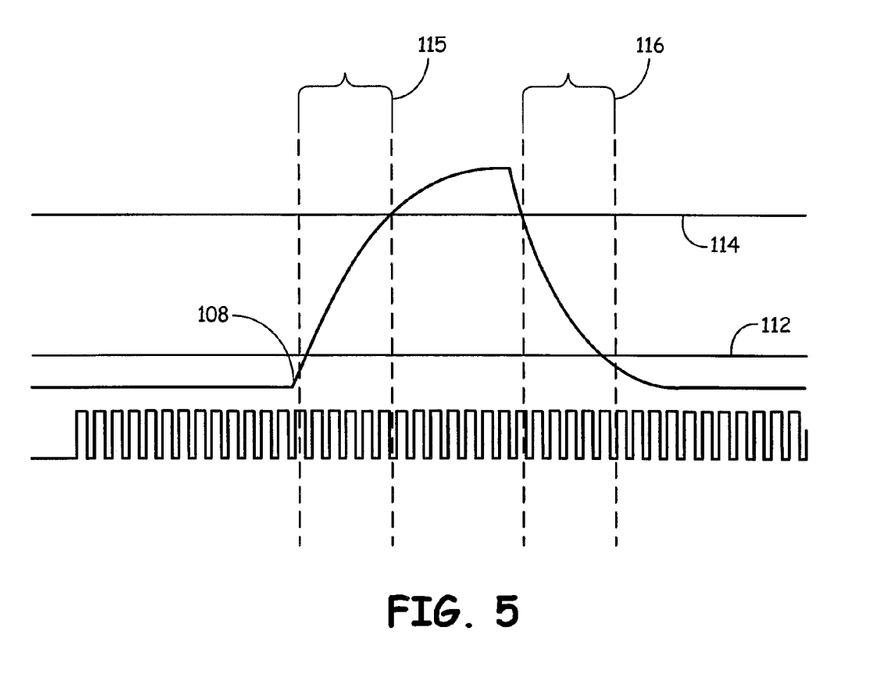
FIG. 5 is a signal graph showing input voltage on a lead of an RTD during diagnostics.

FIG. 5 is a signal graph showing input voltage on a lead of RTD during diagnostics. Testing for a degraded sensor is similar to open sensor testing and can employ the same circuitry. Instead of simply applying the test current, the test current is pulsed with each clock cycle of the controller. Once the test current is pulsed through the sensor and if the lead is connected properly, a voltage step change 108 is detectable at the sensor input connection. The magnitude and time constant of the step change will be dependent on the resistance and capacitance present in the system, modeled diagrammatically at reference numerals 104 in FIG. 4. If a sensor line is not connected, the diagnostic circuitry will not detect the expected voltage change. If there is excessive line resistance and or capacitance, the rise time count period 115 will be longer. The open sensor test output can be sampled at each clock cycle to determine if it has reached the threshold 114. Each sample that is above the low threshold input 112 and below the high threshold 114 can be accumulated and provided as a count value based upon the clock signal that can be used further by the transmitter for other qualification schemes. Fall time can also be accumulated in a similar manner with an inverted threshold value, as indicated at reference numeral 116. The clock counts generated can be compared against expected values or relative time deltas and used to indicate a degraded sensor. In this way, sensor degradation can be determined by monitoring the rise time and fall time of the sensed current pulse. This allows the temperature transmitter 12 to monitor the time constant produced by the inherent lead resistance and system capacitance on each specific lead.

Figure 6A:
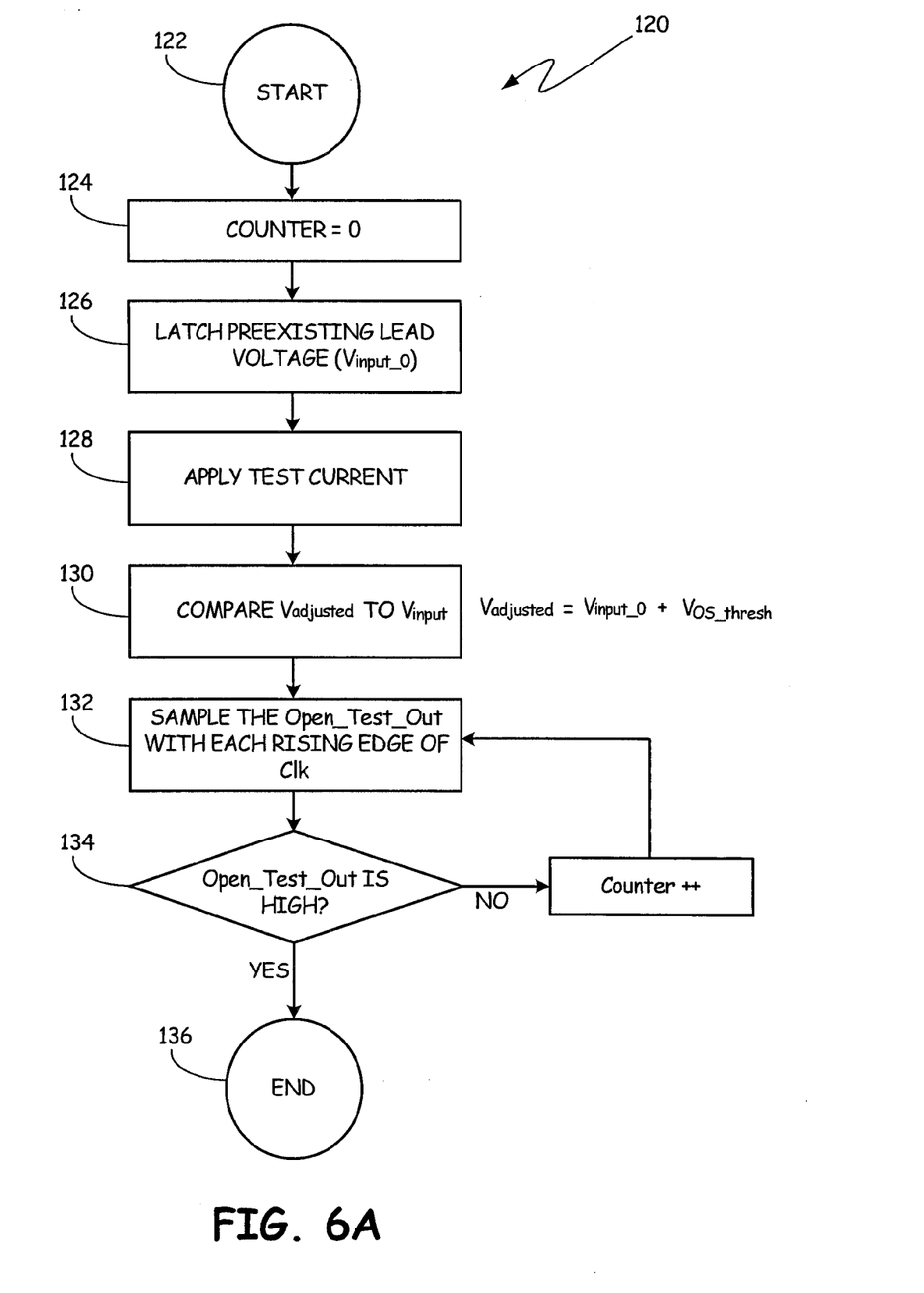
FIG. 6A is a flow diagram of a method of testing a temperature sensor in accordance with an embodiment of the present invention.
Figure 6B:
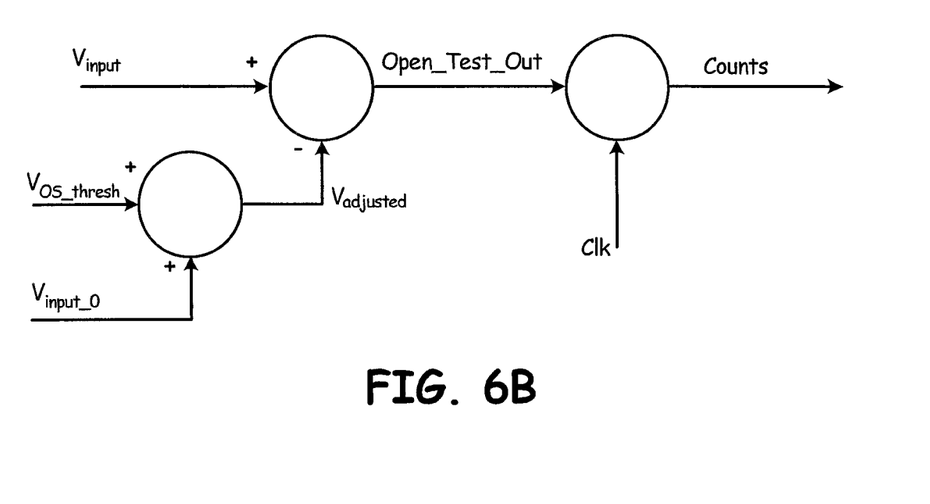
FIG. 6B is a diagrammatic view of an arrangement for generating various signals to diagnose sensor degradation in accordance with an embodiment of the present invention.

FIG. 6A is a simplified flow diagram of a method of testing a temperature sensor in accordance with an embodiment of the present invention. Method 120 begins at block 122 and control passes to block 124 where COUNTER is initialized to zero. Next, at block 126, preexisting voltage on the lead under test is latched as $V_{input\_t0}$. At block 128, the test current is applied to the lead. As set forth above, this test current is preferably a current pulse that is applied at the clock frequency of the controller or microprocessor conducting the test. At block 130, the adjusted voltage ($V_{adjusted}$) is compared to the input voltage ($V_{input}$). The adjusted voltage is the sum of the latched pre-existing input voltage $V_{input\_t0}$ and the open sensor threshold voltage ($V_{OS\_thresh}$) indicated at reference numeral 114 in FIG. 4. The result of the comparison generates the Open_Test_Out signal. For example, this signal is false if $V_{input}$ is less than $V_{adjusted}$ and true when $V_{input}$ is equal to or greater than $V_{adjusted}$. The generation and operation of these various signals is also indicated diagrammatically in the representation shown in FIG. 6B. At block 132, method 120 samples, tests, or otherwise checks the state of the Open_Test_Out signal with each rising edge of the clock of the controller or microprocessor conducting the test. If at block 134 it is determined that the open Open_Test_Out signal is high, method 120 ends at block 136. However, if block 134 determines that Open_Test_Out is not high, the value of COUNTER is incremented based upon the clock signal, and control returns to block 132. In this manner, method 120 will iterate until Open_Test_Out becomes high. At that point, COUNTER will indicate the number of clock pulses that occurred between the between the beginning of the test and the moment when Open_Test_Out went high. Thus, the value of COUNTER will be indicative of the time constant produced by the inherent lead resistance and system capacitance on the lead being tested. A similar test can be used when the current pulse is removed to monitor the fall time. Note that the counter can also be compared to a maximum value which indicates that the high or low threshold has not been reached.

Figure 7:
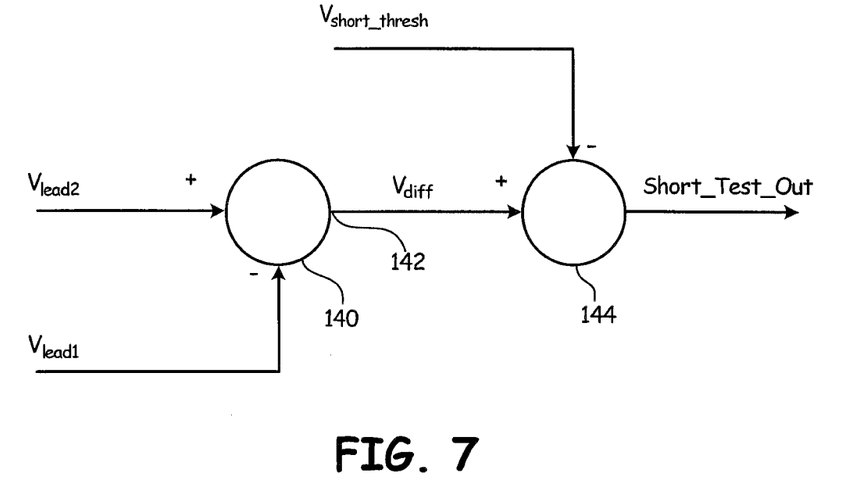
FIG. 7 is a diagrammatic view of an arrangement for testing for a shorted temperature sensor in accordance with an embodiment of the present invention.

FIG. 7 is a diagrammatic view of an arrangement for testing for a shorted temperature sensor in accordance with an embodiment of the present invention. In order to test for a shorted sensor, circuitry 70 monitors the voltage difference between selected leads on either side of RTD element 32. A transmitter specified voltage threshold is used to compare against this differential voltage to determine if the sensor is in a shorted state. Once the difference voltage exceeds the threshold, the circuit can indicate that the sensor is not shorted. The arrangement illustrated in FIG. 7 operates using a pair of leads that are disposed on opposite sides of the temperature sensitive element of RTD 32. A voltage on the first lead ($V_{lead1}$) is measured and applied to difference node 140. A voltage on the second lead ($V_{lead2}$) is also applied to difference node 140 such that the output 142 of node 140 is the difference between $V_{lead1}$ and $V_{lead2}$. The output of node 140 is applied to difference node 144 along with a preselected short circuit voltage threshold ($V_{short\_thresh}$). The output of node 144 is indicative of whether ($V_{lead1}$-$V_{lead2}$) exceeds $V_{short\_thresh}$ and is thus indicative of whether the RTD is in a shorted state.

The techniques and circuit arrangements set forth above allow a temperature transmitter to more quickly determine whether a temperature sensor, such as an RTD, is properly connected and functional. While the time savings may be beneficial for a single temperature sensor, high density temperature transmitters currently in use will achieve significant time savings and thus faster sensor update rates. While currently the detection time for embodiments of the present invention is dependent on the A/D converter conversion decimation rate, detection time can be improved by having the A/D converter interrupt the processor when diagnostics have completed.

Although the present invention has been described with reference to preferred embodiments, workers skilled in the art will recognize that changes may be made in form and detail without departing from the spirit and scope of the invention. For example, while embodiments of the present invention have generally provided a single pulsed current source coupled to all leads while individual circuits measure each lead's voltage, embodiments of the present invention can also be practiced where a single detector is coupled to all leads, and different signals are introduced on each lead. While such an embodiment may be significantly more complex, it is included in order to illustrate the breadth of possibilities enabled by testing a plurality of leads simultaneously. Further, various components may have multiple functions. For example, the same current source, controller and analog to digital converter used to measure temperature can also be used to perform diagnostics.

What is claimed is:

1. A process temperature transmitter operable with at least one temperature sensor having a plurality of leads, the temperature transmitter comprising:
   measurement circuitry operably coupleable to the at least one temperature sensor to provide an indication of an electrical parameter of the at least one temperature sensor which is indicative of temperature of the at least one temperature sensor;
   a controller coupled to the measurement circuitry to obtain the indication and provide a process temperature output;
   a current source configured to apply a test current to the plurality of leads simultaneously; and
   diagnostic circuitry configured to simultaneously measure a voltage response on each lead in response to the test current applied to the plurality of leads simultaneously and responsively to provide a diagnostic indication of the temperature sensor based upon measured voltages.

2. The process temperature transmitter of claim 1, wherein the temperature sensor is an RTD.

3. The process temperature transmitter of claim 1, wherein the plurality of leads includes four leads.

4. The process temperature transmitter of claim 1, wherein the diagnostic indication is indicative of an electrical short.

5. The process temperature transmitter of claim 1, wherein the diagnostic indication is indicative of an open lead.

6. The process temperature transmitter of claim 1, wherein the diagnostic indication is indicative of sensor degradation.

7. The process temperature transmitter of claim 1, wherein the diagnostic indication is indicative of a time constant produced by inherent lead resistance and system capacitance on each lead.

8. The process temperature transmitter of claim 1, wherein the current source is disposed within an analog-to-digital converter application specific integrated circuit (ASIC).

9. The process temperature transmitter of claim 1, wherein the diagnostic indication is based on rise time of the voltage response on each lead.

10. The process temperature transmitter of claim 1, wherein the diagnostic indication is based on fall time of the voltage response on each lead.

11. The process temperature transmitter of claim 10, wherein the diagnostic indication is also based on rise time of the voltage response on each lead.

12. A method of diagnosing at least one temperature sensor connection with a process temperature transmitter, the method comprising:
   measuring temperature using measurement circuitry coupled to the at least one temperature sensor;
   applying a test current to a plurality of leads of the at least one temperature sensor simultaneously;
   detecting a voltage response simultaneously on each lead of the at least one temperature sensor in response to the test current applied to the plurality of leads; and
   generating a diagnostic indication using diagnostic circuitry relative to the at least one temperature sensor based on the voltage response on each lead.

13. The method of claim 12, wherein the diagnostic indication is indicative of an electrical short.

14. The method of claim 12, wherein the diagnostic indication is indicative of an open lead.

15. The method of claim 12, wherein the diagnostic indication is indicative of sensor degradation.

16. The method of claim 12, wherein the diagnostic indication is indicative of a time constant produced by inherent lead resistance and system capacitance on each lead.

17. The method of claim 12, wherein the method is performed before each temperature sensor measurement.

18. The method of claim 12, wherein the at least one temperature sensor includes a plurality of temperature sensors.

19. The method of claim 18, wherein the plurality of temperature sensors are RTDs.

20. A process temperature transmitter operable with at least one temperature sensor having a plurality of leads, the temperature transmitting comprising:
   means for measuring temperature using measurement circuitry coupled to the at least one temperature sensor;
   means for applying a test current to the plurality of leads of the at least one temperature sensor simultaneously;
   means for simultaneously detecting a voltage response on each lead of the at least one temperature sensor in response to test current applied to the plurality of leads; and means for generating a diagnostic indication relative to the at least one temperature sensor based on the voltage response on each lead.

\* \* \* \* \*